US012759488B2

(12) United States Patent
Guadiz

(10) Patent No.: US 12,759,488 B2
(45) Date of Patent: Oct. 13, 2026

(54) POWER DISTRIBUTION MODULE

(71) Applicant: MTD PRODUCTS INC, Valley City, OH (US)

(72) Inventor: Maynard S. Guadiz, Strongsville, OH (US)

(73) Assignee: MTD Products Inc, Valley City, OH (US)

( * ) Notice: Subject to any disclaimer, the term of this patent is extended or adjusted under 35 U.S.C. 154(b) by 22 days.

(21) Appl. No.: 18/750,620

(22) Filed: Jun. 21, 2024

(65) Prior Publication Data

US 2024/0425004 A1 Dec. 26, 2024

Related U.S. Application Data

(60) Provisional application No. 63/509,838, filed on Jun. 23, 2023.

(51) Int. Cl.
*B60R 16/033* (2006.01)
*H02J 7/00* (2026.01)
*H02P 29/68* (2016.01)

(52) U.S. Cl.
CPC ............ *B60R 16/033* (2013.01); *H02J 7/855* (2026.01); *H02P 29/68* (2016.02)

(58) Field of Classification Search
CPC ....... B60R 16/033; H02P 29/68; H02J 7/0063
USPC ........................................................ 307/10.1
See application file for complete search history.

(56) References Cited

U.S. PATENT DOCUMENTS 4,052,751 A * 10/1977 Shepard ................. H02H 3/331 361/50
4,839,530 A 6/1989 Greenwood
4,902,956 A 2/1990 Sloan
5,175,484 A 12/1992 Witehira et al.
5,204,992 A 4/1993 Carpenter
5,381,295 A 1/1995 Rund et al.
5,612,659 A 3/1997 Kerber
6,144,110 A 11/2000 Matsuda et al.
6,271,642 B1 8/2001 Dougherty et al.
6,909,944 B2 6/2005 Pillar et al.
6,917,502 B2 7/2005 Enzinna et al.
7,166,986 B2 1/2007 Kendall
7,166,990 B2 1/2007 Lo
7,265,457 B2 9/2007 Yasui et al.
7,332,881 B2 2/2008 Clark et al.
(Continued)

FOREIGN PATENT DOCUMENTS

EP 0829786 B1 11/2004
WO 2007/041828 A1 4/2007
(Continued)

*Primary Examiner* — Michael R. Fin
(74) *Attorney, Agent, or Firm* — Wegman Hessler

(57) ABSTRACT

A power distribution module (PDM) for a vehicle is discussed. PDMs discussed herein can comprise one or more improvements that are related to the pre-charge circuit, the contactor drive circuit, or both. One example embodiment is a PDM comprising: a pre-charge circuit configured to increase an output voltage to one or more motor controllers from zero to an operating voltage, wherein the pre-charge circuit is configured to increase the output voltage linearly; and a contactor drive circuit comprising a contactor coil, wherein the contactor drive circuit is configured to control activation of the pre-charge circuit.

1 Claim, 14 Drawing Sheets

(56) References Cited

U.S. PATENT DOCUMENTS

| | | | |
|---|---|---|---|
| 7,354,280 B2 | 4/2008 | Gordon et al. | |
| 8,013,611 B2 | 9/2011 | Elder et al. | |
| 8,030,881 B2 | 10/2011 | Owens et al. | |
| 8,129,951 B2 | 3/2012 | Turner et al. | |
| 8,446,128 B2 | 5/2013 | Lickfelt | |
| 8,502,409 B2 | 8/2013 | Kato et al. | |
| 8,569,912 B2 | 10/2013 | Lim et al. | |
| 9,162,639 B2 | 10/2015 | Kanzaki et al. | |
| 9,221,409 B1 | 12/2015 | Gauthier et al. | |
| 9,227,581 B1 | 1/2016 | Gauthier et al. | |
| 9,419,312 B2 | 8/2016 | Ziarnik et al. | |
| 9,493,088 B2 | 11/2016 | Wei et al. | |
| 9,573,540 B2 | 2/2017 | Kanzaki et al. | |
| 9,644,594 B2 | 5/2017 | Betscher et al. | |
| 9,669,782 B2 | 6/2017 | Suzuki et al. | |
| 9,789,764 B2 | 10/2017 | Bissontz | |
| 9,815,423 B2 | 11/2017 | Flaster | |
| 9,821,737 B2 | 11/2017 | Brooks et al. | |
| 9,821,738 B2 | 11/2017 | Joao | |
| 9,825,273 B2 | 11/2017 | Dulle | |
| 9,914,416 B2 | 3/2018 | Bolger et al. | |
| 9,956,931 B2 | 5/2018 | Janarthanam et al. | |
| 10,270,175 B2 | 4/2019 | Benbouhout et al. | |
| 10,322,688 B2 | 6/2019 | Harvey et al. | |
| 10,411,308 B2 | 9/2019 | Moteki et al. | |
| 10,486,627 B2 | 11/2019 | Han et al. | |
| 10,581,056 B2 | 3/2020 | Dulle et al. | |
| 10,608,447 B2 | 3/2020 | Varughese | |
| 10,800,411 B2 | 10/2020 | Kinoshita | |
| 2002/0101217 A1* | 8/2002 | Hosoda | B60K 6/54<br>903/917 |
| 2010/0308647 A1 | 12/2010 | Fluhrer et al. | |
| 2011/0273812 A1* | 11/2011 | Beer | F02D 41/20<br>361/152 |
| 2015/0200524 A1 | 7/2015 | Seel et al. | |
| 2017/0166065 A1* | 6/2017 | Hong | H02J 7/00 |
| 2018/0316279 A1* | 11/2018 | Imura | H02M 1/36 |
| 2018/0348794 A1 | 12/2018 | Berkley et al. | |
| 2019/0096621 A1* | 3/2019 | Chen | H01H 85/06 |
| 2019/0140245 A1 | 5/2019 | Mensch et al. | |
| 2019/0296541 A1* | 9/2019 | Mensch | B60L 3/04 |
| 2020/0018796 A1 | 1/2020 | Conell et al. | |
| 2020/0021210 A1 | 1/2020 | Schulenberg et al. | |
| 2020/0114780 A1 | 4/2020 | Douglass et al. | |
| 2020/0114847 A1 | 4/2020 | Harvey et al. | |
| 2020/0195000 A1 | 6/2020 | Douglass | |
| 2024/0083253 A1* | 3/2024 | Wesenauer | B60L 3/0046 |
| 2024/0371549 A1* | 11/2024 | Guo | H01C 7/028 |
| 2025/0304162 A1* | 10/2025 | Kohler | B62D 55/06 |

FOREIGN PATENT DOCUMENTS

| | | |
|---|---|---|
| WO | 2011024707 A1 | 3/2011 |
| WO | 2020/178245 A1 | 9/2020 |

* cited by examiner

First PDM
100

POWER DISTRIBUTION MODULE

CROSS REFERENCE TO RELATED APPLICATION

The present application for patent claims the benefit of priority from U.S. Provisional Application No. 63/509,838 filed Jun. 23, 2023 and titled POWER DESTRUCTION MODULE, which is hereby incorporated by reference herein in its entirety and for all purposes.

FIELD OF DISCLOSURE

The disclosed subject matter pertains to apparatuses and methods for electrical power distribution, such as a power distribution module employable in outdoor power equipment.

BACKGROUND

Modem vehicles comprise a variety of electrical systems powered by a single electrical source (e.g., battery), each of which can have different requirements for voltage, current, etc. A power distribution module (PDM) can be employed by a vehicle to power each of the vehicle's electrical systems according to the requirements of those systems.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Various embodiments of the present disclosure include a power distribution module (PDM) for a vehicle, comprising: a pre-charge circuit configured to increase an output voltage to one or more motor controllers from zero to an operating voltage, wherein the pre-charge circuit is configured to increase the output voltage linearly; and a contactor drive circuit comprising a contactor coil, wherein the contactor drive circuit is configured to control activation of the pre-charge circuit.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1:
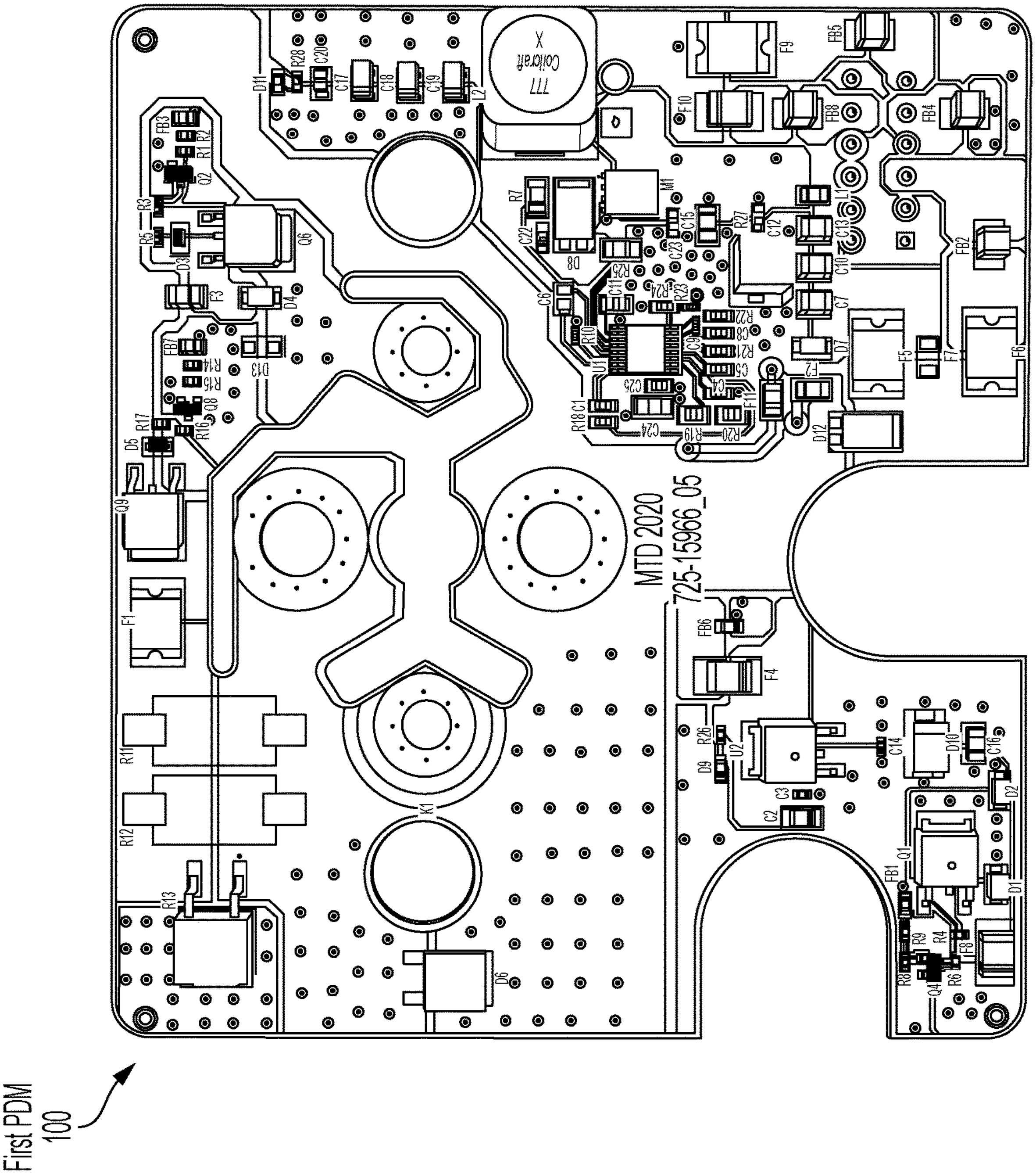
FIG. 1 illustrates a diagram showing a layout of a first control board for a first power distribution module (PDM), in connection with various embodiments discussed herein.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to power distribution modules for motor controllers in power equipment machines are described herein, it should be understood that the disclosed machines, electronic and computing devices and methods are not so limited and modifications may be made without departing from the scope of the present disclosure. The scope of the systems, methods, and electronic and computing devices for disclosed power distribution modules are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

Various embodiments can comprise power distribution modules (PDMs) for a vehicle (e.g., outdoor power equipment, etc.). PDMs discussed herein can comprise one or more improvements that are related to the pre-charge circuit, the contactor drive circuit, or both. One example embodiment is a PDM comprising: a pre-charge circuit configured to increase an output voltage to one or more motor controllers from zero to an operating voltage, wherein the pre-charge circuit is configured to increase the output voltage linearly; and a contactor drive circuit comprising a contactor coil, wherein the contactor drive circuit is configured to control activation of the pre-charge circuit.

Figure 2:
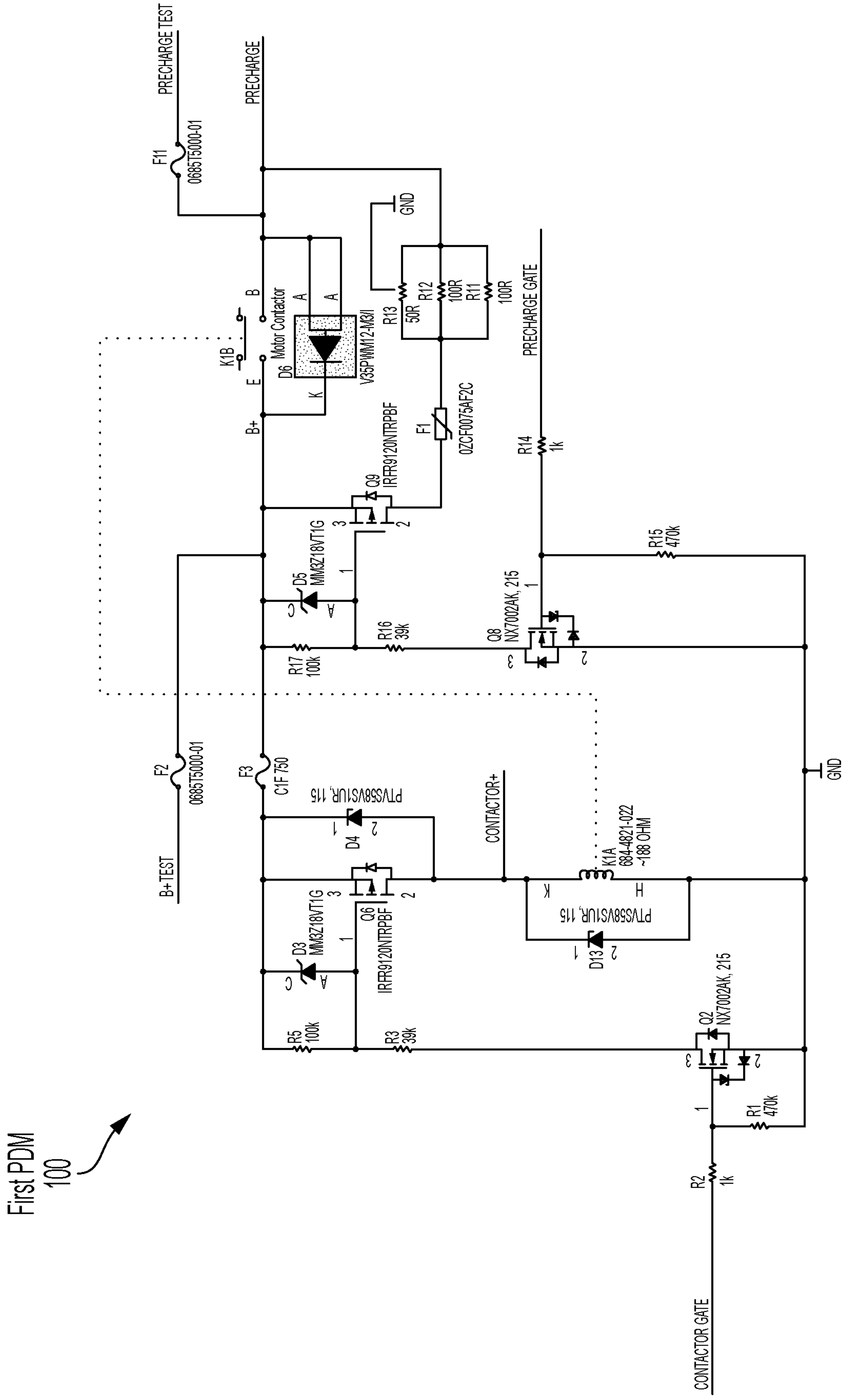
FIG. 2 illustrates a first circuit diagram showing a schematic of the first control board, in connection with various embodiments discussed herein.
Figure 3:
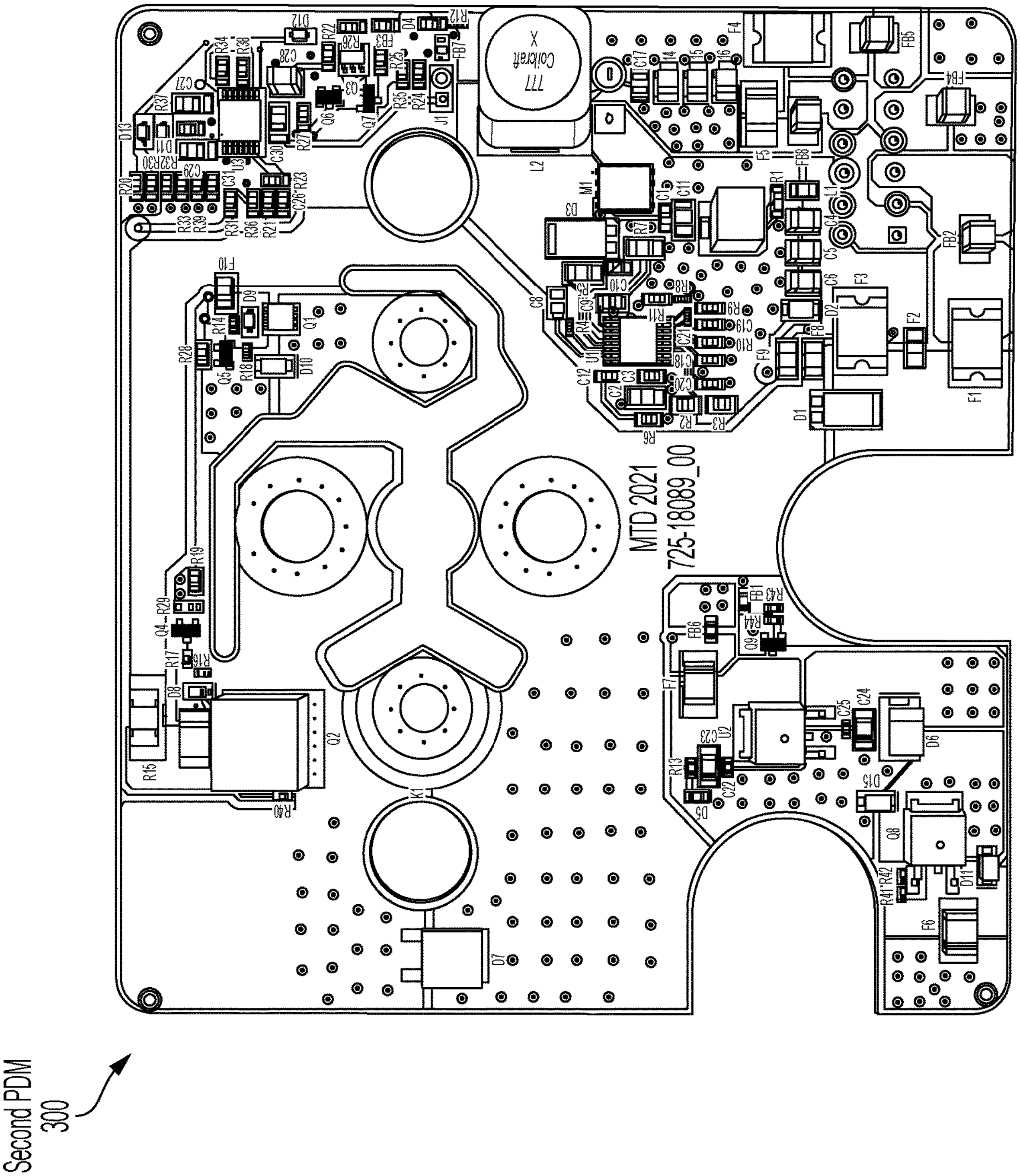
FIG. 3 illustrates a diagram showing a layout of a second control board for a second PDM 300 that improves upon the first PDM, in connection with various embodiments discussed herein.
Figure 4:
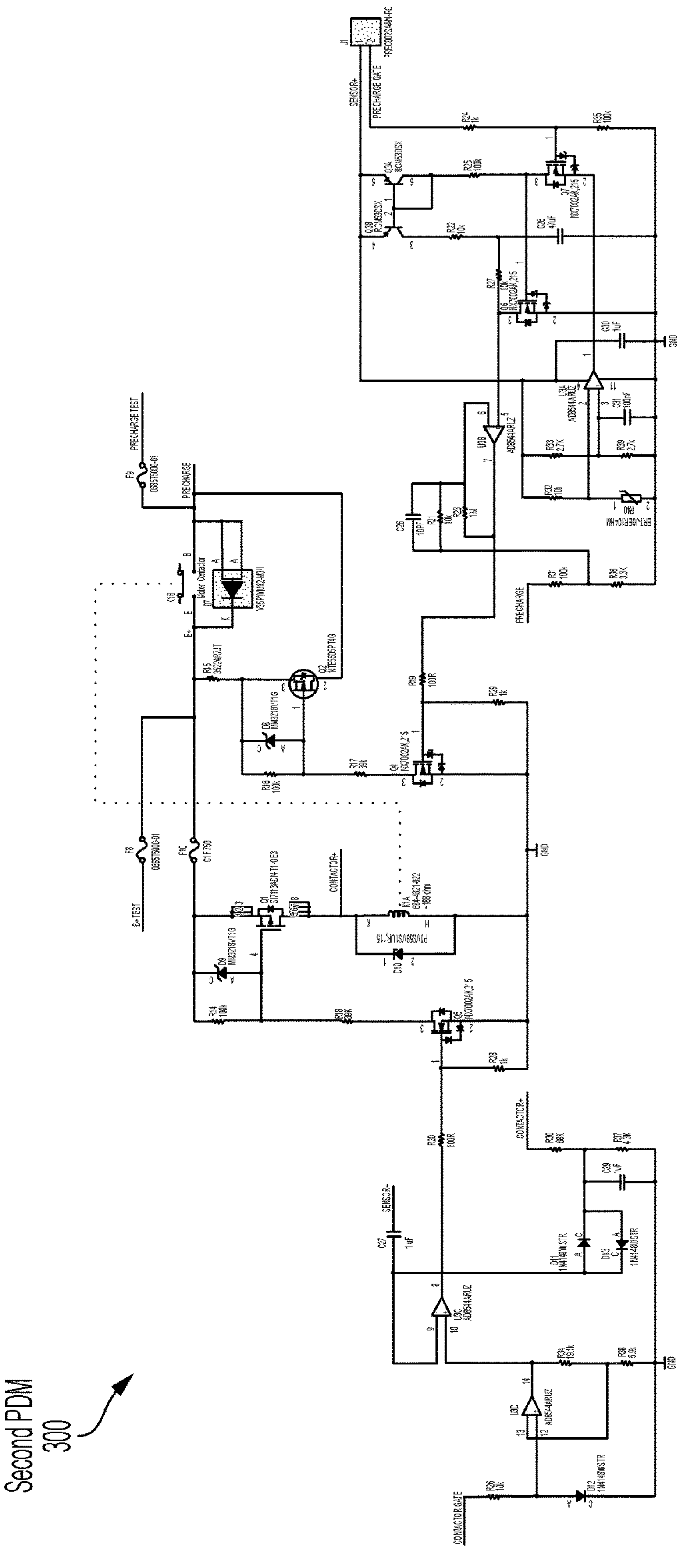
FIG. 4 illustrates a second circuit diagram showing a schematic of the second control board, in connection with various embodiments discussed herein.

Referring to FIG. 1, illustrated is a diagram showing a layout of a first control board for a first power distribution module (PDM) 100, in connection with various embodiments discussed herein. Referring to FIG. 2, illustrated is a first circuit diagram showing a schematic of the first control board, in connection with various embodiments discussed herein. Referring to FIG. 3, illustrated is a diagram showing a layout of a second control board for a second PDM 300 that improves upon the first PDM, in connection with various embodiments discussed herein. Referring to FIG. 4, illustrated is a second circuit diagram showing a schematic of the second control board, in connection with various embodiments discussed herein. The second PDM has a number of improvements over the first PDM, as discussed in greater detail below.

Pre-Charge Improvement

Figure 5:
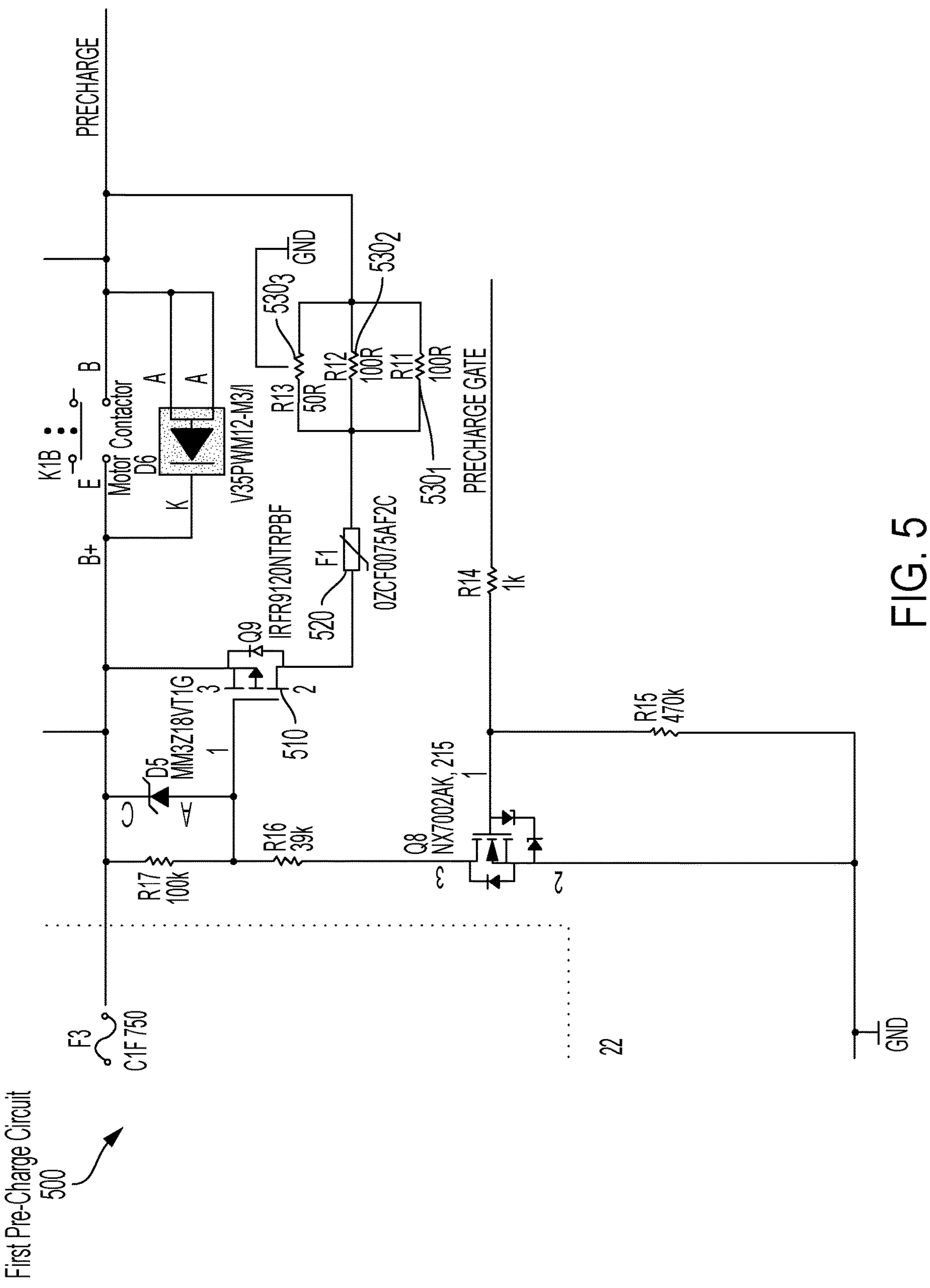
FIG. 5 illustrates a circuit diagram showing the pre-charge circuit of the first PDM, in connection with various embodiments discussed herein.

A first improvement of the second PDM over the first PDM is the pre-charge circuit. Referring to FIG. 5, illustrated is a circuit diagram showing the pre-charge circuit 500 of the first PDM 100, in connection with various embodiments discussed herein.

The pre-charge circuit 500 in the first PDM 100 is a series configuration of a P-Channel Metal Oxide Semiconductor Field Effect Transistor (MOSFET) 510, positive temperature coefficient (PTC) thermistor 520, and power resistor(s) 530*i* to limit the max current sourced from the battery to the motor controllers. When the key is inserted, the battery is enabled and the 12V DC/DC is brought up to power the Vehicle Control Module (VCM). Within the VCM startup procedure, the pre-charge is enabled for a maximum of 5 seconds. When the pre-charge is enabled, the motor controllers slowly increase in voltage. At some point during this pre-charge sequence, the motor controllers are brought up to a minimum turn on voltage and begin to report their respective voltages on the Controller Area Network (CAN) bus (somewhere around 24 to 30V). When the VCM receives voltage messages from each motor controller reporting at least 66% of battery voltage, the contactor is enabled and a check is performed to verify each controller is above 95% of battery voltage to ensure the contactor had indeed closed. After a short delay, the pre-charge circuit is turned off. The system is now in standby waiting for input conditions to transition into operation mode.

The first pre-charge circuit 500 uses a fixed series resistance and results in a non-linear capacitive charge curve that decreases in current as the controllers charge up. The limitation is that any quiescent current consumption by the controllers will limit the maximum attainable charge voltage which was observed to be as much as 25% of the battery in some cases. A 12V contactor differential is about 200 A and is a characteristic of Equivalent Series Resistance (ESR) of the power path from the battery though the harness, lugs, power board, contactor, connectors all the way through to the motor controller capacitors and back to the battery. There are additional non linearities due to variable types, quantity of controllers, and power up dynamics of each controller current consumption as they are being brought up to operating voltage. This results in pre-charge times that may vary from platform to platform and even unit to unit due to controller variability. The ideal pre-charge circuit might be comprised of some form of a constant current switching regulator however, this requires current sense circuitry or specialized controller integrated circuits (ICs) and may be more costly when implemented on the high side. A low side implementation is not possible as the power and control board ground within the PDM is common to the motor controller return path, contactor coil ground, and battery ground.

Development and testing in connection with various embodiments discussed herein included the ability to simulate the linear voltage trend of a fixed capacitance that is charged with a constant current. This can be achieved by creating a linear voltage regulator that tracks a reference voltage generated by a small reference current charging a relatively small capacitor. The result is a linearly increasing pre-charge voltage curve that is independent of load capacitance, meaning it can pre-charge multiple (e.g., 2, 3, 4, 5, etc.) controller platforms to greater than 95% of battery voltage in the exact same time (e.g., just under 2 seconds for second pre-charge circuit 600 of FIG. 6, etc.). Like any other low dropout (LDO) regulator limitations, the circuit will, of course, dissipate more power for higher capacitances. The improved circuit (e.g., second pre-charge circuit 600 of FIG. 6, etc.) features temperature qualification in the case of faults or repeated key cycling. In practice, the load current is not constant for reasons mentioned previously but is very close to constant.

Figure 6:
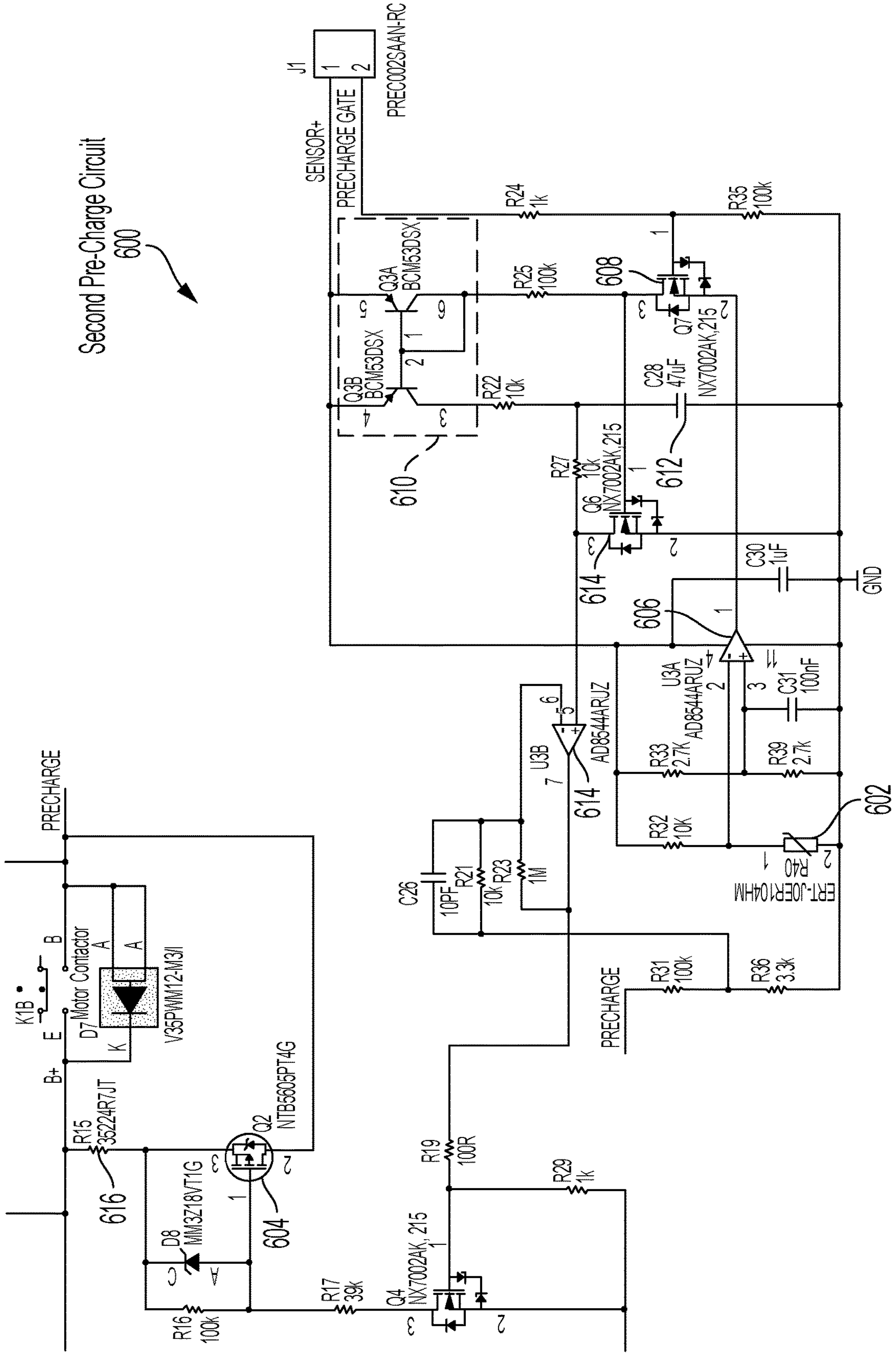
FIG. 6 illustrates a circuit diagram of the improved pre-charge circuit of the second PDM, in connection with various embodiments discussed herein.
Figure 7:
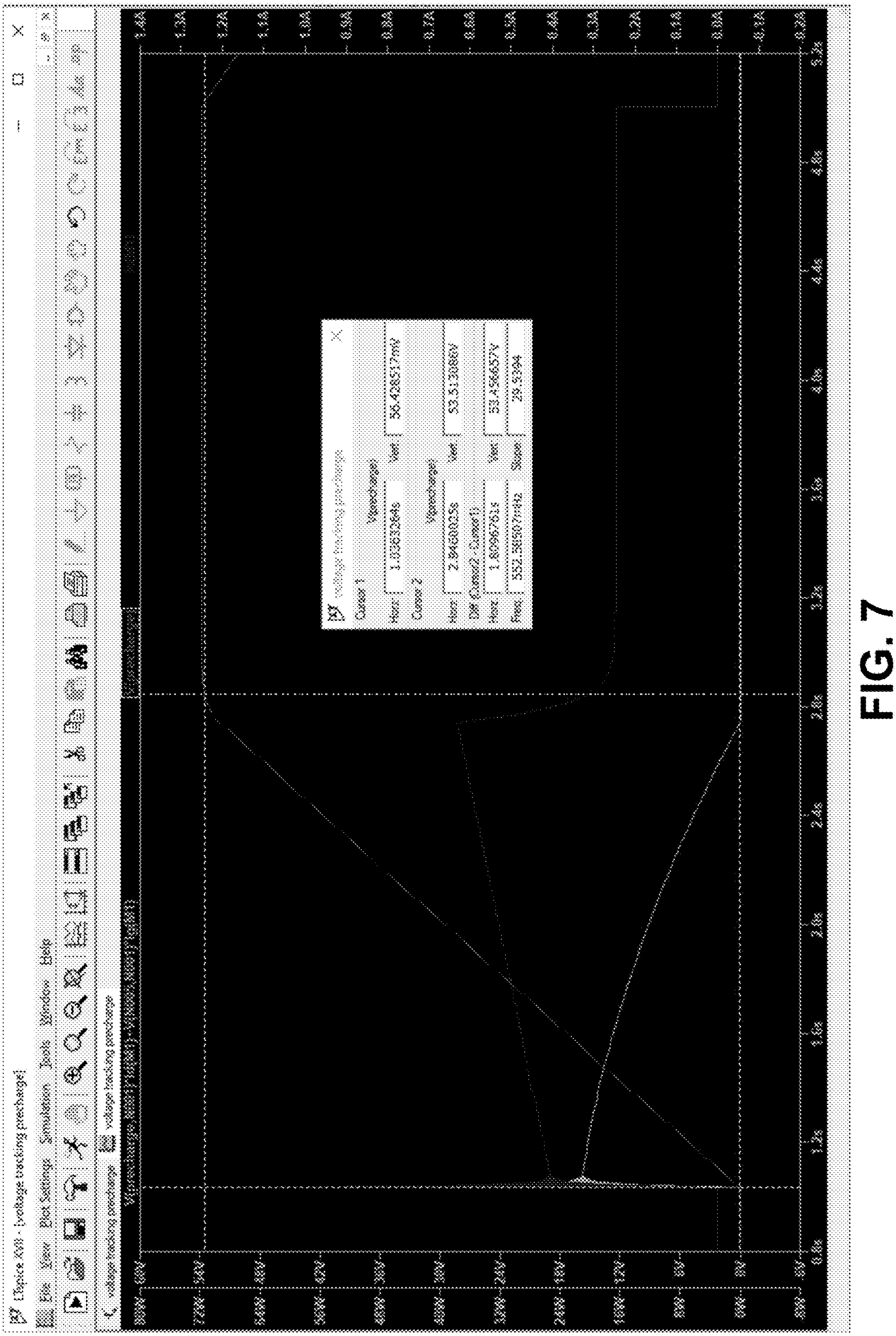
FIG. 7 illustrates a graph showing simulation data for the example second pre-charge circuit, in connection with various aspects discussed herein.
Figure 8:
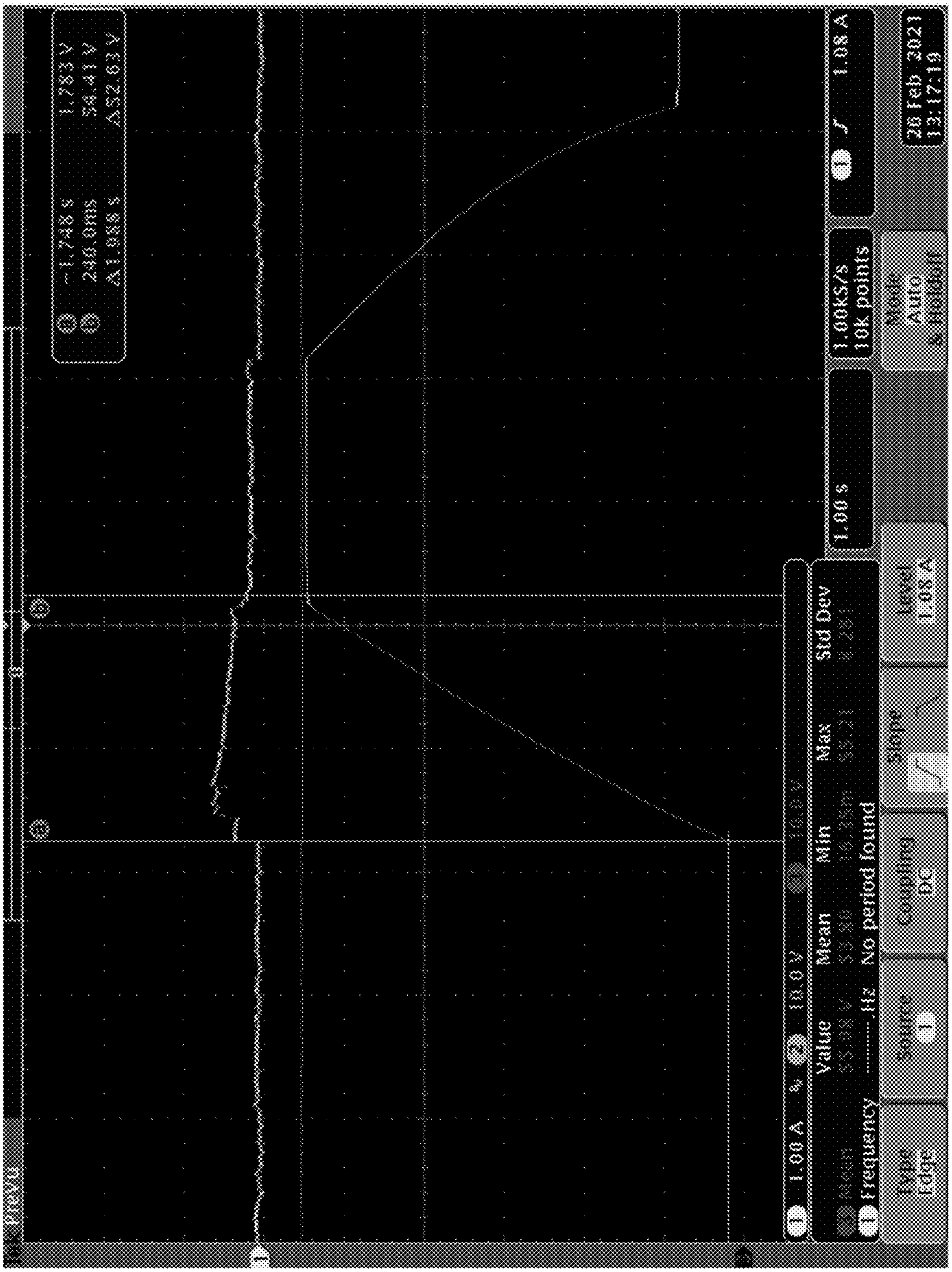
FIG. 8 illustrates a graph showing actual performance of a prototype of the example second pre-charge circuit, in connection with various aspects discussed herein.

Referring to FIG. 6, illustrated is a circuit diagram of the improved pre-charge circuit 600 of the second PDM 200, in connection with various embodiments discussed herein. The following discussion explains the operation of circuit 600. Referring to FIG. 7, illustrated is a graph showing simulation data for the example second pre-charge circuit 600, in connection with various aspects discussed herein. Referring to FIG. 8, illustrated is a graph showing actual performance of a prototype of the example second pre-charge circuit 600, in connection with various aspects discussed herein.

If the resistance of the thermistor 602 (also labeled R40) in the second pre-charge circuit 600 is greater than a threshold resistance (e.g., 10KΩ for the example embodiment of FIG. 6, wherein the resistance of thermistor 602 is 100KΩ at 25° C.), the temperature in close proximity to the series pass charge metal-oxide-semiconductor field-effect transistor (MOSFET) 604 (also labeled Q2) is less than a threshold temperature associated with the threshold resistance (e.g., 80° C., or greater or lesser in various embodiments, e.g., 70-90, 60-100, 60-110, etc.). When the temperature in close proximity to MOSFET 604 is less than the threshold temperature, this drives the output of the operational amplifier (op amp) 606 (also labeled U3A) to ground. If the temperature is greater than the threshold temperature (e.g., 80° C., etc.), then the op amp 606/U3A drives the output high and the pre-charge trigger is inhibited. If the temperature conditions are met (e.g., at or below the threshold temperature), MOSFET 608 (also labeled Q7) can activate the matched pair bipolar junction transistor (BJT) current mirror 610 (comprising BJTs labeled Q3A and Q3B). When the pre-charge activation signal from the Vehicle Control Module (VCM) is driven high (e.g., around 5V-12V, etc.), a small reference current (e.g., around 44 μA in example second pre-charge circuit 600, but greater or lesser values in various embodiments, e.g., 35-55 μA, 40-50 μA, etc.) is generated. The reference current output of the current mirror charges capacitor 612 (also labeled C28) and generates a new reference voltage that increases at a substantially fixed rate (e.g., a rate of about 0.94V/second in example second pre-charge circuit 600, but greater or lesser values in various embodiments, e.g., 0.9-1V/s, 0.8-1.1V/s, etc.). MOSFET 614 (also labeled Q6) can be used to keep capacitor 612 (C28) discharged and to ensure the reference voltage starts close to zero when the pre-charge cycle begins. When the charge cycle begins, the increasing reference voltage is fed into the non-inverting input of comparator 614 (also labeled U3B). The negative feedback is the pre-charge voltage connected to the motor controllers through a voltage divider to generate a gain (31.3V/V in example pre-charge circuit 600, though greater or lesser values can be used in various embodiments) which charges the load capacitance (e.g., at a rate of about 29.4V/s in example pre-charge circuit 600, but which can vary in embodiments based on the gain). In example pre-charge circuit 600, this equates to about 55V in just under 2 seconds. This output stage is a slight modification to the pre-charge circuit 500 of the first PDM 100. The high cost, low availability power resistors 530*i* were removed from circuit 500 and a lower power, lower resistance 4.7 ohm power resistor 616 was added inline. The series pass MOSFET 510 of pre-charge circuit 500 was upgraded to a more thermally robust Double Decawatt Package (D2PAK, standardized as Joint Electron Device Engineering Council (JEDEC) TO-263) 604 which, in circuit 600, functions as a variable power resistor. The PTC 520 was also removed due to the inclusion of the thermal qualification feature. Unlike the reference capacitor 520, the pre-charge load has variable resistive and capacitive components and is also dynamic so the charge current is not constant and gradually increases with voltage until the load capacitors are no longer charging. When the capacitors stop charging, the current will drop to the quiescent current of the sum of the motor controllers on the pre-charge load and the power dissipated by the pre-charge FET becomes negligible. A pre-charge simulation of 14850 uF and 220 ohm load will result in average power dissipated by the pre-charge MOSFET of about 12 W over 2 seconds or about 24J. This load is equivalent to 5 of the Zongshen 18G motor controllers (more capacitance than the 24G controllers) with approximately double the quiescent current. During initial benchtop testing and observation using a thermal camera, it was observed that it took an excess of more than 30 cycles in succession to trigger the thermal protection circuit in open air at room ambient. In circuit 500, the thermal protection threshold was set to 125° C. (175° C. MOSFET thermal junction (TJ)) but it is suspected that there may be a larger temperature differential between the sensor and the MOSFET junction. Using the 125° C. threshold, the MOSFET had failed short and the subsequent pre-charge cycle max current of 11 A allowed by the 4.7 ohm power resistor to charge the load caused the power resistor to fail in a non-glorious high impedance fashion, much like a fuse.

Contactor Coil Economization

Figure 9:
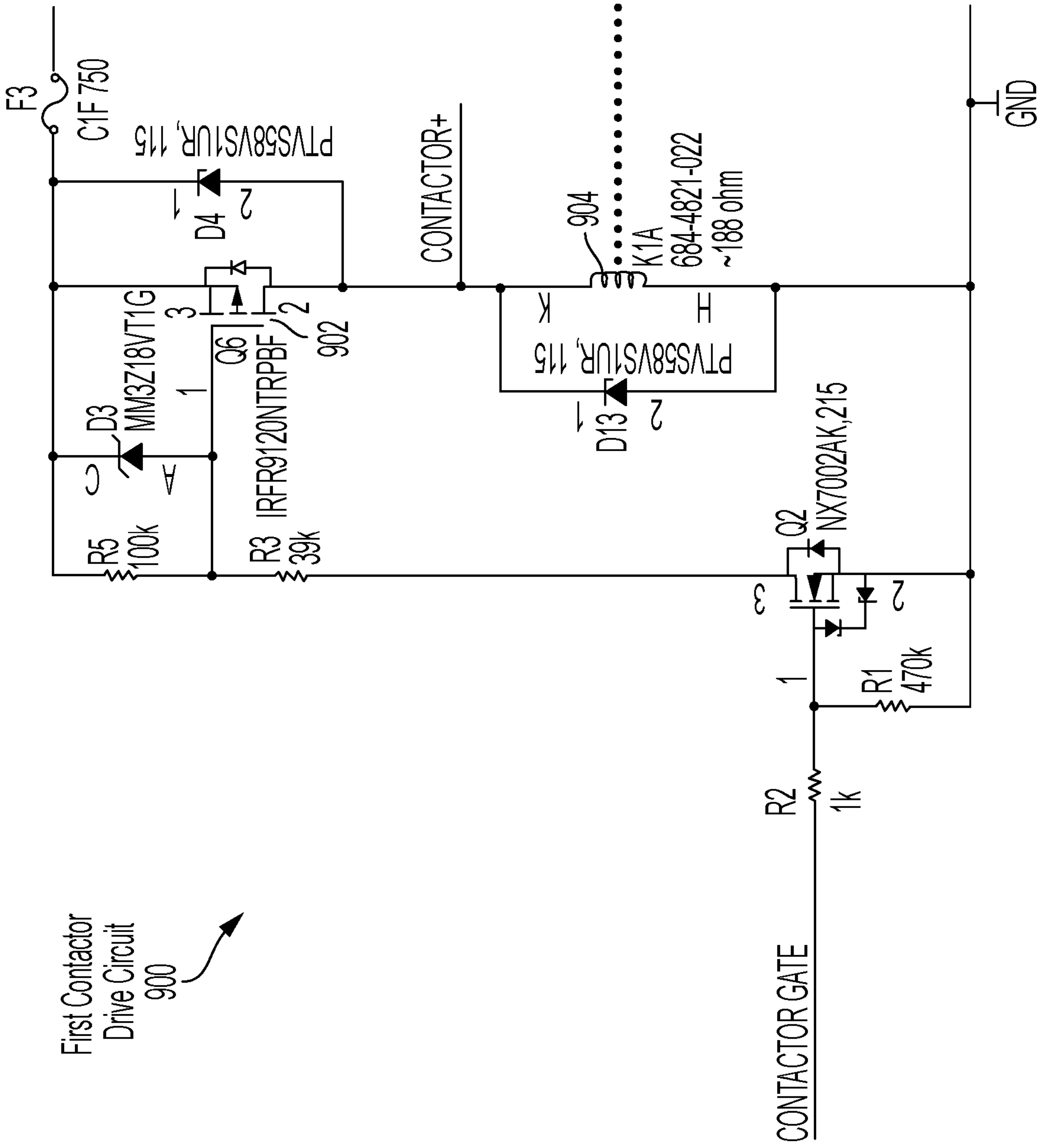
FIG. 9 illustrates circuit diagram showing the contactor drive circuit of the first PDM, in connection with various embodiments discussed herein.

Referring to FIG. 9, illustrated is a circuit diagram showing the contactor drive circuit 900 of the first PDM 100, in connection with various embodiments discussed herein. The first contactor drive circuit 900 is a basic high side load switch with a transient voltage suppressor (TVS) freewheeling diode to protect the MOSFET 902. This was done to preserve contactor wear by allowing expedient collapse of the magnetic field and reducing the contactor time to open, which reduces arc time. However, circuit 900 had some failures of the contactors in the field which led to discussions with the supplier, Trombetta. It was suggested that the contactor coil 904 may have moisture trapped within the windings and excessive heat can cause the moisture to bake out leading to corrosion on the spring contact connections to the coil studs. This may lead to unreliable, undesirable activation/deactivation of the contactor. Rapid deactivation and activation of the contactor can cause the contacts to weld as heat from the arc can melt the contact metals and bond them together if closed again with insufficient time to cool. Additionally, a contactor with stainless steel springs was supplied by Trombetta for testing.

Figure 10:
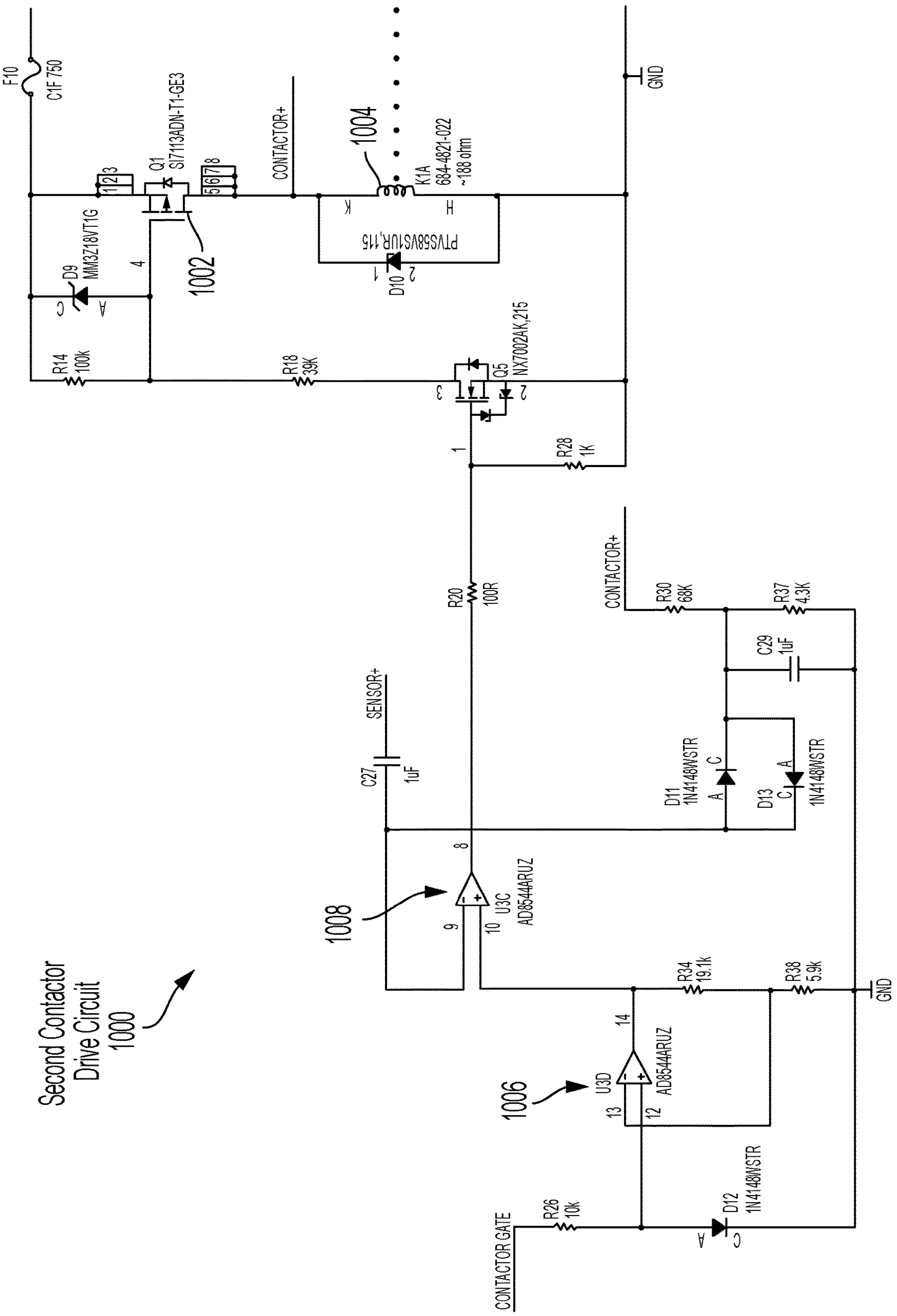
FIG. 10 illustrates a circuit diagram showing the contactor drive circuit of the second PDM, in connection with various embodiments discussed herein.
Figure 11:
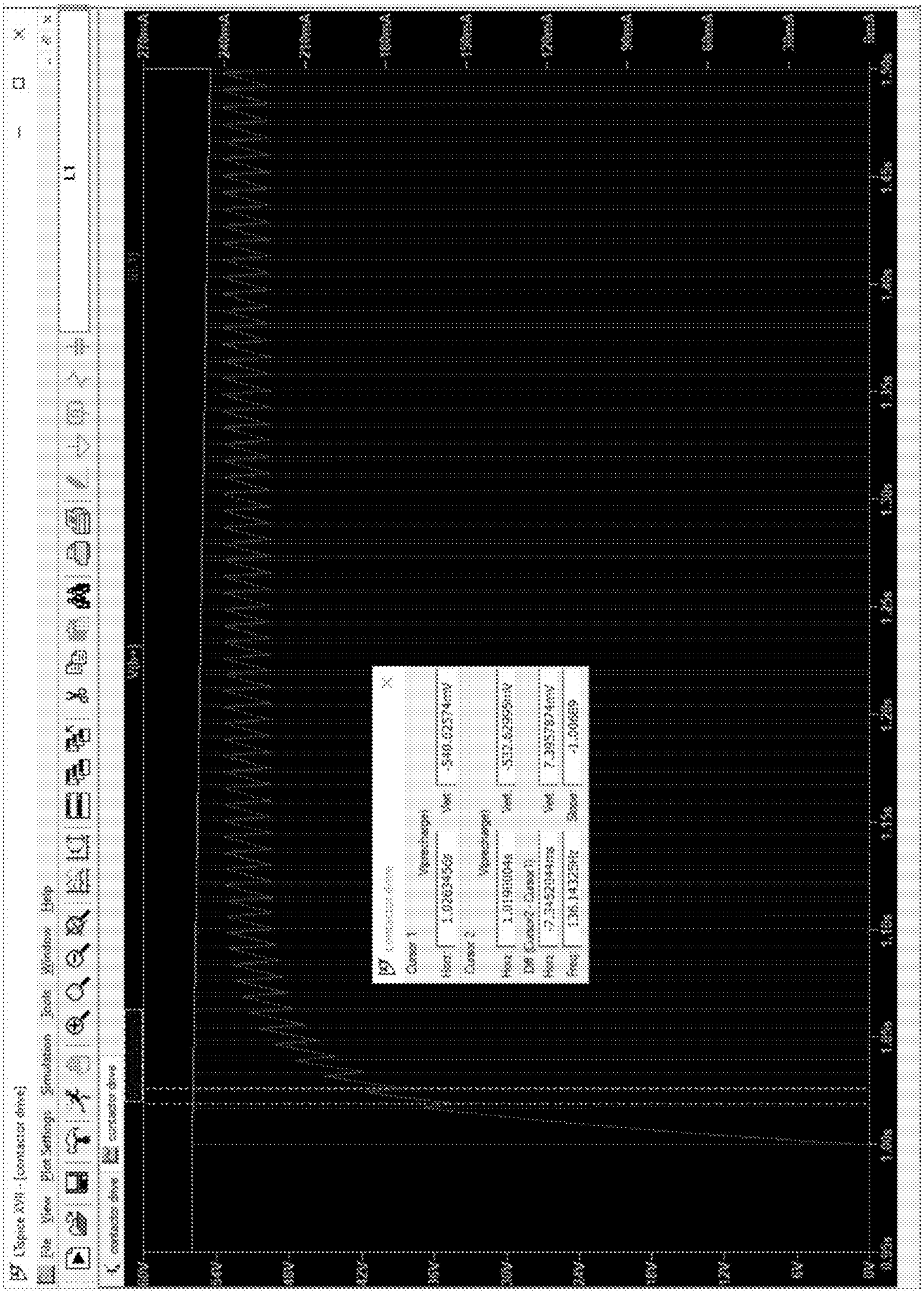
FIG. 11 illustrates a graph showing simulation data for the example second contactor drive circuit, in connection with various aspects discussed herein.
Figure 12:
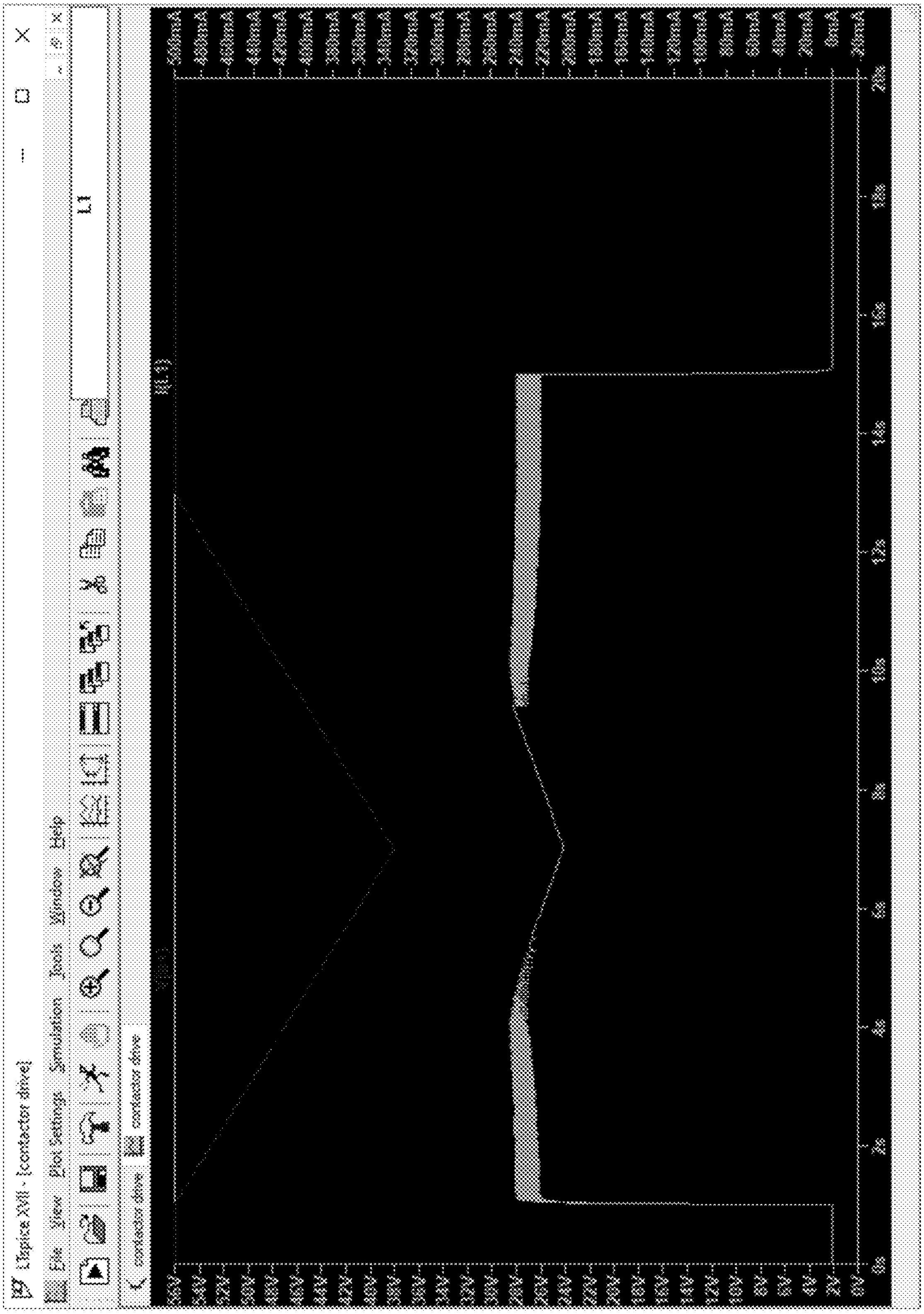
FIG. 12 illustrates a graph showing additional simulation data for the example second contactor drive circuit, in connection with various aspects discussed herein.

Referring to FIG. 10, illustrated is a circuit diagram showing the contactor drive circuit 1000 of the second PDM 300, in connection with various embodiments discussed herein. Referring to FIG. 11, illustrated is a graph showing simulation data for the example second contactor drive circuit 1000, in connection with various aspects discussed herein. Referring to FIG. 12, illustrated is a graph showing additional simulation data for the example second contactor drive circuit 1000, in connection with various aspects discussed herein.

At maximum battery voltage, the contactor coil 1004 of circuit 1000 will dissipate just over 16 W of heat inside of the housing of second PDM 300. The basis of this design leverages the very high inductance of the contactor coil (4 Henrys) and is a type of Pulse Width Modulation (PWM) voltage controller. In circuit 1000, the freewheeling diode was repositioned from circuit 900 to be antiparallel with the contactor coil 1004 to reduce freewheeling conduction losses and maintain the coil current on the off cycles to lower the current ripple at low frequencies. The high side switch of circuit 900 was changed to a smaller package, more capable, more available, and lower cost MOSFET for circuit 1000. Circuit 1000 generates a low frequency PWM (>=120 Hz variable) to modulate the battery voltage as it discharges from 55V down to 42V. Any voltage less than 42V will behave as a battery pass-through. By modulating the coil to 42V, the power dissipated by the coil is reduced down to 9.5 W. This will also allow the PDM 300 and internal circuitry such as the 12V buck regulator to run much cooler.

The way circuit 1000 works is as follows. A 5-12V signal from the VCM into the PDM contactor activation pin generates a diode drop signal into the non-inverting input of op amp 1006 (also labeled U3D). This reference is amplified by a gain to generate a new reference voltage (of 2.5V in example circuit 1000) and is input into op amp 1008 (also labeled U3C). This circuit looks similar to a non-inverting amplifier with a gain of R30/R37+1 (or 16.81V/V, for the resistance values in example circuit 1000, with the result being an output amplified by the gain (around 42V in example circuit 1000). This can work by itself, but the frequency will be much higher and could be problematic for electromagnetic compliance (EMC compliance). Additional capacitors were added to filter the voltage feedback and diodes add a hysteresis band around the control voltage to reduce the frequency to around 120 Hz. The result is a continuous triangular shape current in the coil centered around about 225 mA with ripple current of 18.4 mA peak-to-peak with negligible power dissipation by the load switch 1002 (also labeled Q1).

As noted above, various embodiments of a contactor drive circuit discussed herein (e.g., circuit 1000, etc.) can employ stainless steel contactor coil springs.

Additional Potential Improvements

Figure 13:
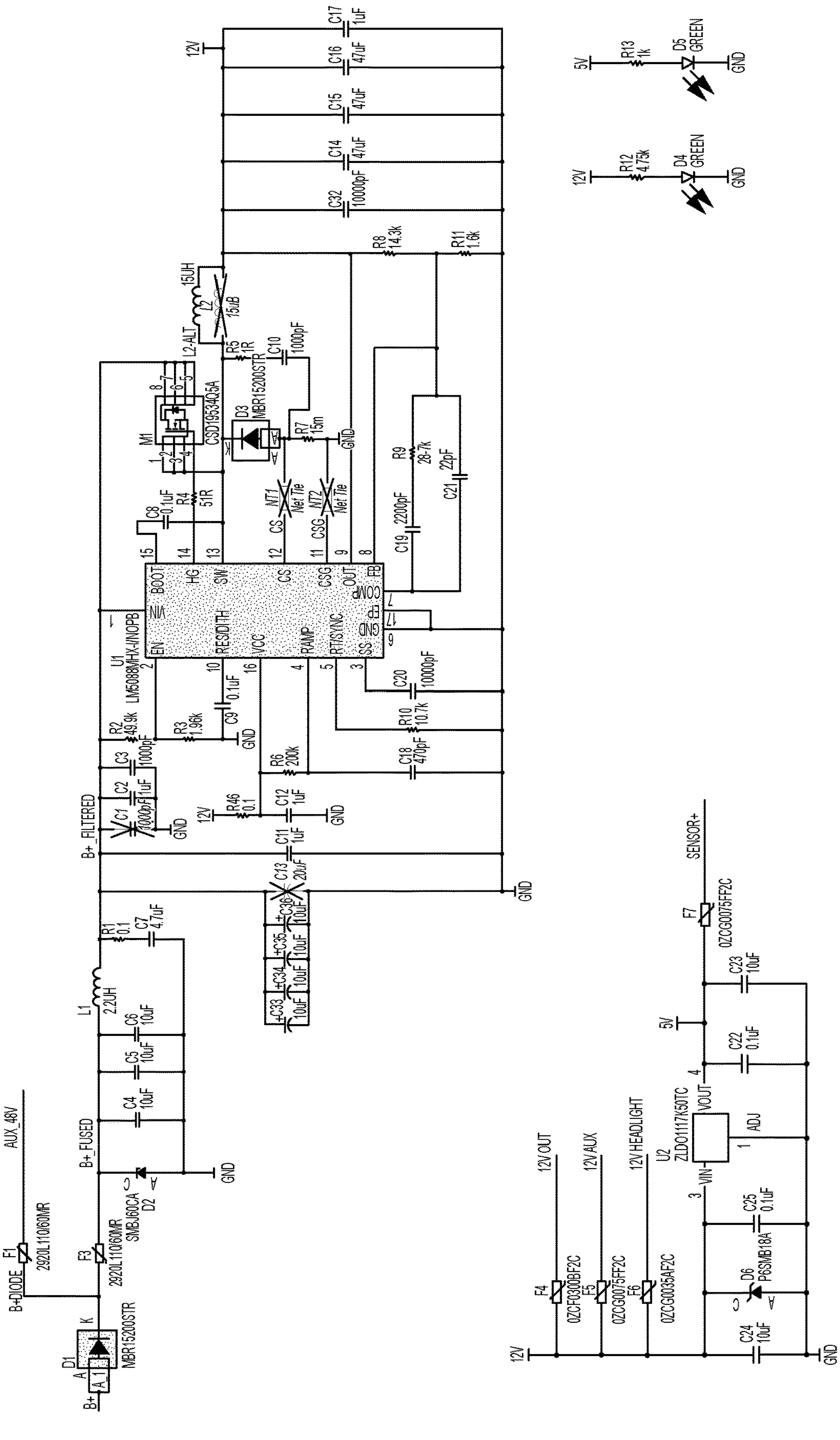
FIG. 13 illustrates a first circuit diagram of an example control board of a PDM according to various aspects discussed herein.
Figure 14:
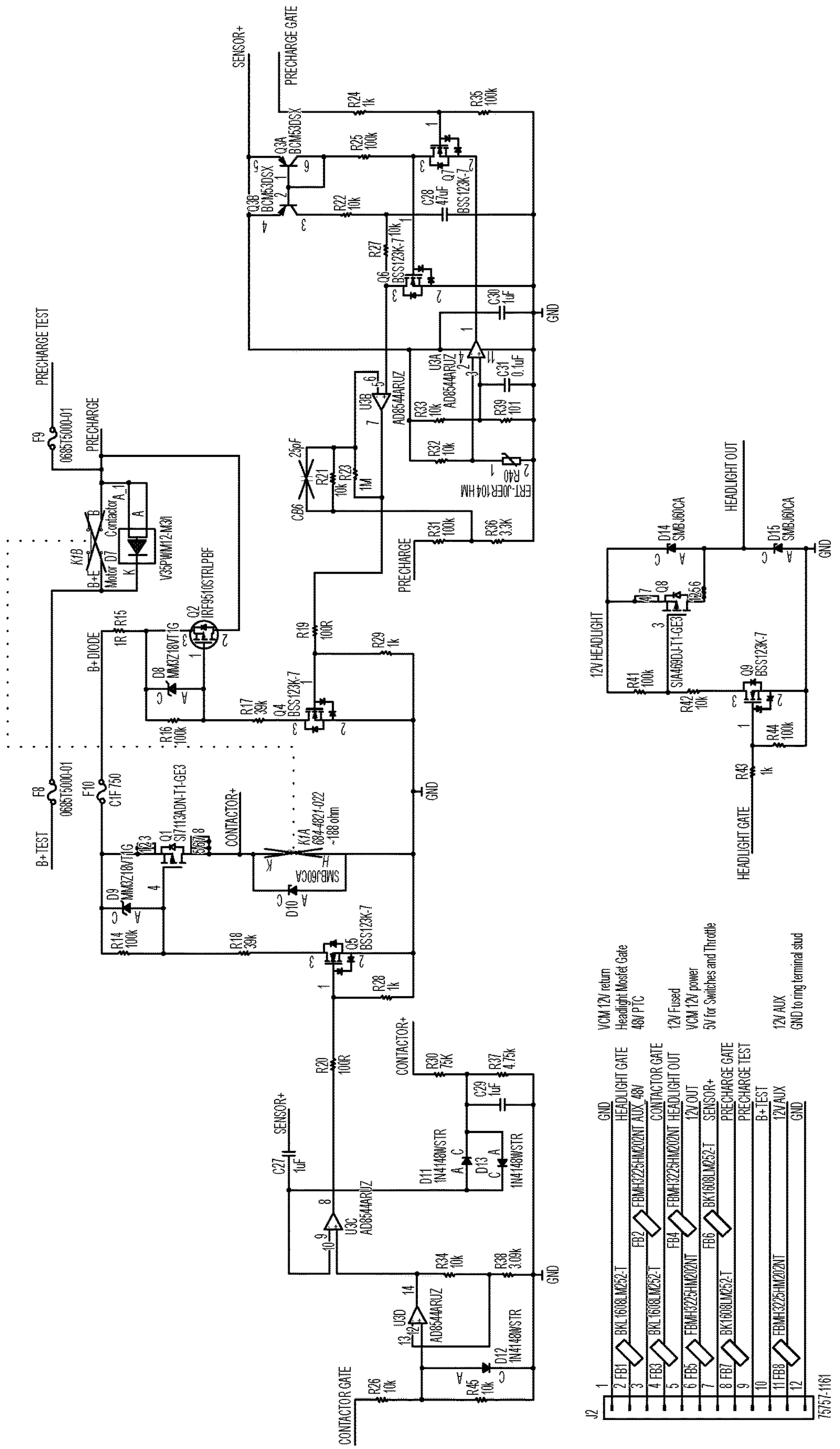
FIG. 14 illustrates a second circuit diagram of an example control board of a PDM according to various aspects discussed herein.

Referring to FIGS. 13 and 14, illustrated are two circuit diagrams of an example control board of a PDM according to various aspects discussed herein.

In various embodiments, PDM 300 or other improved PDMs can have hardware and software compatibility with the same components as PDM 100. Hardware solutions would not require additional time in VCM software development, testing, and qualification. The improved PDM 300, etc. could then be backward compatible with existing production systems as a service or replacement part for PDM 100.

Additionally, PDM 300, etc. can have EMC and DC/DC converter optimizations over PDM 100. The load capacitors were relocated to the other side of the inductor toward the load connections to reduce the loop for EMC. Copper polygons were adjusted and maximized to reduce parasitic inductances. More surface area was added to the freewheeling diode to improve heat dissipation and output power rating.

In various embodiments, the PTC used in the headlight load switch circuit can be coordinated with the UL test requirement to eliminate the harness fuse.

Additionally, in various embodiments, PEM nuts can be integrated into the power board in place of the nut captured in the housing to retain the fuses.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. Moreover, embodiments described in a particular drawing or group of drawings should not be limited to those illustrations. Rather, any suitable combination or subset of elements from one drawing(s) can be applied to other embodiments in other drawings where suitable to one of ordinary skill in the art to accomplish objectives disclosed herein, known in the art, or reasonably conveyed to one of ordinary skill in the art by way of the context provided in this specification. Where utilized, block diagrams of the disclosed embodiments or flow charts are grouped for ease of understanding. However, it should be understood that combinations of blocks, additions of new blocks, re-arrangement of blocks, and the like are contemplated in alternative embodiments of the present disclosure.

Based on the foregoing it should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A power distribution module (PDM) for a vehicle, comprising:

a pre-charge circuit configured to increase an output voltage to one or more motor controllers from zero to an operating voltage, wherein the pre-charge circuit is configured to increase the output voltage linearly; and a contactor drive circuit comprising a contactor coil, wherein the contactor drive circuit is configured to control activation of a contactor coil circuit;

wherein the output voltage is generated via a first operational amplifier configured to amplify a linearly increasing reference voltage based on a fixed gain to charge a load capacitor; and wherein the reference voltage is generated via a capacitor configured to be charged by a current mirror.

* * * * *